United States Patent Office 2,890,175
Patented June 9, 1959

---

2,890,175

METHOD OF INHIBITING FORMATION OF SCALE DEPOSITS

Harry J. Kipps, Los Angeles County, Calif., assignor, by mesne assignments, to Socony Mobil Oil Company, Inc., a corporation of New York No Drawing. Application May 27, 1954
Serial No. 432,945

4 Claims. (Cl. 252—181)

This invention relates to the prevention of scale formation on surfaces exposed to water containing carbonates or other salts of the alkaline-earth metals, and it is particularly applicable to the equipment in oil wells and to the pipes, tanks, and other surface equipment associated with oil wells.

The saline water produced with petroleum usually contains substantial quantities of calcium and magnesium and smaller amounts of the other alkaline-earth metals. In its natural condition in the earth, the aqueous solution of minerals is stable. But as the water approaches a well bore and moves into it, it usually becomes unstable by the loss of carbon dioxide through reduction of pressure, and perhaps by other mechanisms. The effect is to produce supersaturation with respect to the carbonates of calcium and other alkaline-earth metals. The carbonates deposit as scale at points where the energy level of the water is changed by turbulence or otherwise. In a few cases the scale deposit includes or consists of sulfates of the heavier alkaline-earth metals, especially barium.

The scale builds up especially around the perforations of well strainers, in well pumps and their valves, in collecting pipes and tanks above ground, and on the heating coils of the tanks or scrubbers used to separate water from the oil. Consequently flow channels are restricted or closed, pumps become abraded or stuck, and heating coils become insulated.

The scale may be removed by inhibited hydrochloric acid, but to do so is costly and requires removing a well from production for a considerable period. It is preferable to prevent the formation of scale by introducing inhibiting agents to the bottom of a well through the annular space between the tubing and casing. In some cases the scale does not deposit appreciably within a well but does deposit in surface equipment such as scrubbers; in such cases treatment of the well may be omitted and the inhibiting agent applied to the equipment which requires protection.

The agents which have been preferred for this purpose are aqueous solutions of alkali-metal polyphosphates, usually sodium hexametaphosphate, employed either alone or in combination with tannins, sulfonates, or both. The polyphosphates inhibit formation of scale in two ways, by sequestering ions of the alkaline-earth metals and by being adsorbed upon the crystal nuclei, thus substantially preventing accumulation of deposits upon surfaces and growth of suspended nuclei to the point where deposition occurs.

The polyphosphates, however, have a serious disadvantage in that they tend to revert to the orthophosphates. The latter are not only useless as scale inhibitors but also actually harmful, because orthophosphate deposits and mixed deposits including orthophosphates are much more difficult to remove by acid or otherwise than the carbonate deposits.

Reversion to orthophosphate occurs rapidly at the high temperatures encountered at the bottoms of oil wells and in water-separating equipment. It occurs more slowly but to a substantial degree in the storage and transportation of solutions prepared for inhibiting scale. I have found that polyphosphate compositions, handled in the manner customary in the petroleum industry, often lose more than half of their sequestering power even before being introduced to a well.

I have discovered that the reversion of polyphosphates to orthophosphate may be prevented and the scale-inhibiting properties of polyphosphates may be enhanced by the addition of a small proportion of an alkali-metal salt of N,N-dihydroxyethylglycine. The sodium salt of this material, in aqueous solution, is available commercially under the trademark "Versene Fe-3 Specific." This substance is a member of the class of alkali-metal salts of certain synthetic amino acids which have the power of sequestering or chelating polyvalent metallic ions.

These amino acids and their alkali-metal salts are capable of inhibiting deposition of scale when used alone, and some of them have been proposed for such use in equipment such as boilers having efficient water-return systems. But the synthetic amino acids are much more costly than the polyphospates; furthermore, they do not exhibit the "threshold effect," i.e., the property of the polyphosphates to temporarily inhibit deposition of salts event though there is insufficient polyphosphate present to sequester all of the metallic ions subject to precipitation. Therefore the amino-acid chelating agents have not been regarded as suitable for inhibiting formation of scale in oil wells and in other places where large quantities of water must be treated and where the agent cannot be reused or recovered. Dihydroxyethylglycine, in particular, has been considered relatively ineffective for chelating ions of the alkaline-earth metals.

When dihydroxyethylglycine is used with a polyphosphate as disclosed herein, such effect as it may have to sequester ions of the alkaline-earth metals is minor and incidental. Its primary function is to protect the polyphosphate from reversion to orthophosphate and from other reactions which impair its usefulness.

I am not able to express an adequate theory in explanation of the effect of the dihydroxyethylglycine. As a sequestering agent, the product is known to be somewhat specific for ferric ions; therefore it is reasonable to suppose that its effect is at least partially due to the chelation of the minute amount of dissolved iron which may be naturally present in the water or may be introduced by corrosion reactions. There is some evidence that dissolved iron impairs the effectiveness of polyphosphates, but not that it is a required catalyst for the reversion to orthophosphate.

There is a relationship between the proportion of dihydroxyethylglycine required and the amount of iron present in the water to be treated. In an "iron free" system, in which the amount of dissolved iron is so slight as to be undetectable by ordinary methods, one part by weight of dihydroxyethylglycine, as the sodium salt, to ten or even twenty parts of polyphosphate is sufficient. In a system containing normal quantities of dissolved iron, one part of the same to four or five parts of polyphosphate is to be preferred. This suggests that the iron present in the solution must be chelated by the agent, but it is uncertain whether this is because the polyphosphate must be protected from the ions of iron or whether there must be an excess of dihydroxyethylglycine over the amount required to chelate the iron, to act upon the polyphosphate in some unknown manner.

As a sensitive test of the scale-forming properties of water, I have employed the procedure of forcing the water through sintered glass or metal filter discs and observing the change in permeability of the filter. The following table shows the results of comparative tests of brine from the Eocene sands of the Helm field of California, untreated and treated with sodium hexametaphosphate, with sodium dihydroxyethylglycinate, and with both.

| Designation of Test | P.p.m. Sodium Hexametaphosphate | P.p.m. sodium dihydroxyethylglycinate | Volume Through Filter, as bbl./sq.ft. | Initial Filter Permeability, md. | Final Filter Permeability, md. | Percent of Initial Permeability |
|---|---|---|---|---|---|---|
| A | 0 | 0 | 21 | 187 | 44 | 24 |
| B | 10 | 0 | 16.5 | 180 | 77 | 43 |
| C | 50 | 0 | 18 | 220 | 113 | 51 |
| D | 0 | 17 | 21 | 165 | 87 | 53 |
| E | 10 | 2 | 21 | 200 | 200 | 100 |
| F | 10 | 2 | 21 | 240 | 228 | 95 |

Tests A, B, C, D, and E were performed in the laboratory. Test F was an experiment of the same kind performed in the field with fresh brine. In each of these tests a sintered glass filter disc was employed. I have obtained results consistent with these in experiments employing sintered metal filters.

Since the above tests were performed at atmospheric temperature and the phosphate solutions had not been subjected to long storage, the phenomenon indicated is the synergistic effect gained by using the polyphosphate and the dihydroxyethylglycine together, whereby the combination yields better results than greater amounts of either of the sequestering agents employed alone.

I have also conducted experiments to determine the effect of dihydroxyethylglycine to inhibit reversion of polyphosphates or orthophosphate. A scale-inhibiting solution containing about 20% of commercial sodium hexametaphosphate and a minor proportion of the sodium salts of petroleum sulfonic acids was tested for polyphosphate content, and it was found that 96% of the total phosphate present was in the form of polyphosphates. One sample of this solution was exposed to a temperature of 140° F. for thirty minutes and again tested. It was found that the proportion of polyphosphate, with respect to total phosphates, had dropped to 71%. Another sample was subjected to storage in the field for six months. Upon testing, it was found that the polyphosphate proportion in this sample had dropped to 37%. The same scale-inhibiting solution was modified by addition of sodium dihydroxyethylglycinate in proportions of one part of the latter to four parts of the phosphate by weight. At the time the dihydroxyethylglycinate was added, after 30 minutes at 140° F., and after six months of storage in the field, the proportion of polyphosphate with respect to total phosphate was uniformly 93%. An aqueous solution of tetrasodium pyrophosphate, in which the proportion of polyphosphate with respect to total phosphate was 98%, was exposed to a temperature of 140° F. for thirty minutes, both without dihydroxyethylglycinate and with the agent present in proportions of 1:4 with respect to the phosphate. The polyphosphate proportion in the sample containing dihydroxyethylglycine remained at 98%; in the other sample it dropped to 80%.

Other polyphosphates such as the triphosphate and the tetraphosphate are merely intermediates between the metaphosphate and the pyrophosphate, and, as might be expected, they respond in the same manner.

Over thirty oil wells have been successfully treated by injecting into the annular space within the casing an aqueous solution having the following composition:

Sodium hexametaphosphate _percent by weight_ 20
Sodium dihydroxyethylglycinate _____do____ 5
Solutine turquoise G _____percent__ 0.0004
Water _____percent by weight__ 75

The blue dye added to the composition has no function except to give the solution a recognizable color, a feature which is convenient under the conditions of oil-field use.

The above composition is injected into wells in amounts of about one quart for each fifty barrels of water to be treated.

In one well of the Santa Fe Springs field in California, down-the-hole repair jobs had averaged six per year over a eight-year period. Since changing from a hexametaphosphate-tannin-sulfonate composition to the above scale-inhibiting composition, no down-the-hole maintenance jobs were required for a period of about eight months. A well of the Lost Hills field, also in California, had averaged five jobs per year and the frequency of the jobs had increased until one was needed each month. The well was then placed on scale control with the above composition and no-down-the-hole repair jobs were needed for about seven months.

In the Wilmington field of California scale formation in wells is less severe, but deposits of barium sulfate build up rapidly on the heating coils, walls, and floor of the scrubber tanks used for separating water from the oil. I have found that dosing the water in these tanks with about 20 parts per million of the above composition (about a sixth of the dosage usually preferred in wells) gives adequate protection against formation of scale deposits.

The composition is also suitable for use with waters other than oil-field brines, including those which are ordinarily not called "saline," such as hard fresh water.

I claim as my invention:

1. The method of inhibiting formation of scale deposits on surfaces exposed to water containing alkaline-earth metals in solution which comprises: adding to said water an alkali-metal salt of N,N-dihydroxyethylglycine and an alkali-metal polyphosphate in proportions of one part of said dihydroxyethylglycinate to about four to twenty parts of said polyphosphate by weight, in amount sufficient to inhibit deposition of salts of alkaline-earth metals.

2. The method of inhibiting formation of scale deposits on surfaces exposed to water containing alkaline-earth metals in solution which comprises: adding to said water at least about one part per million of an alkali-metal salt of N,N-dihydroxyethylglycine and at least about four parts per million of an alkali-metal polyphosphate.

3. The method of inhibiting formation of scale deposits on surfaces exposed to water containing alkaline-earth metals in solution which comprises: adding to said water at least about one part per million of an alkali-metal salt of N,N-dihydroxyethylglycine and at least about four part per million of sodium hexametaphosphate.

4. The method of inhibiting formation of scale deposits on surfaces exposed to water containing alkaline-earth metals in solution which comprises: adding to said water an aqueous solution of an alkali-metal salt of N,N-dihydroxyethylglycine and an alkali-metal polyphosphate, said aqueous solution containing one part of said dihydroxyethylglycinate to about four to twenty parts of said polyphosphate.

References Cited in the file of this patent

UNITED STATES PATENTS 2,592,511   Chittum _____ Apr. 8, 1952

OTHER REFERENCES

Versene—Technical Bull. No. 1 (1949), pages 1(a), 1, 8, 10 and 11.

Sequestrene—Alrose Chem. Co., Providence, R. I. (1952), pages 1, 36 and 50.

The Versenes—Bergsworth Chem. Co., Tech. Bull. No. 2 (1952), Sec. 1, pages 17 and 19.

Chaberek et al.: J.A.C.S., vol. 75, pages 2185-2190 (May 5, 1953).